Inventor.
John A. Hennessy.
by Parker & Carter
Attorneys.

March 9, 1943.  J. A. HENNESSY  2,313,436
VARIABLE SPEED DEVICE
Filed Oct. 31, 1941   2 Sheets-Sheet 2
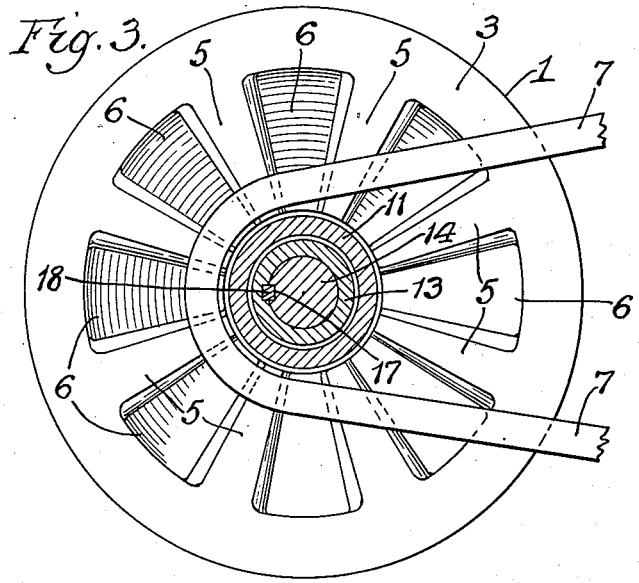
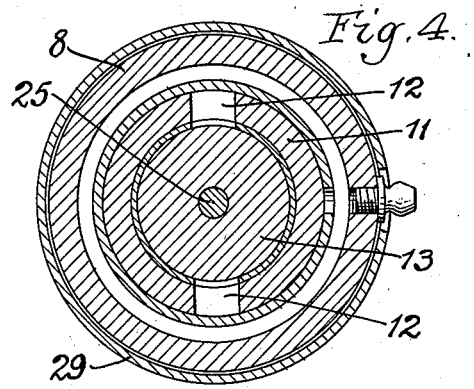
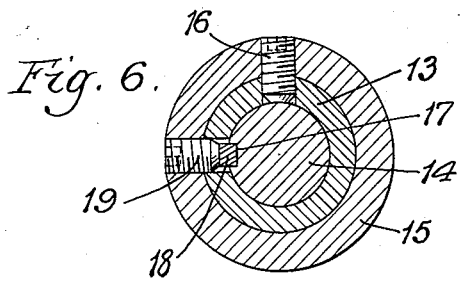
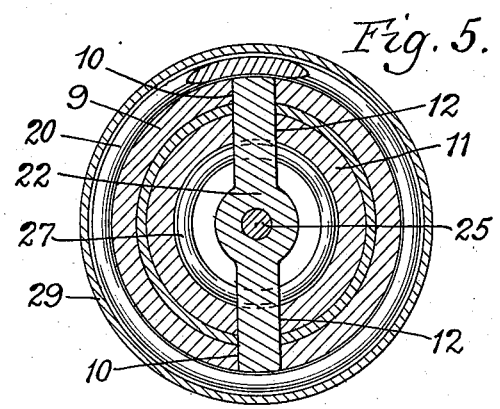
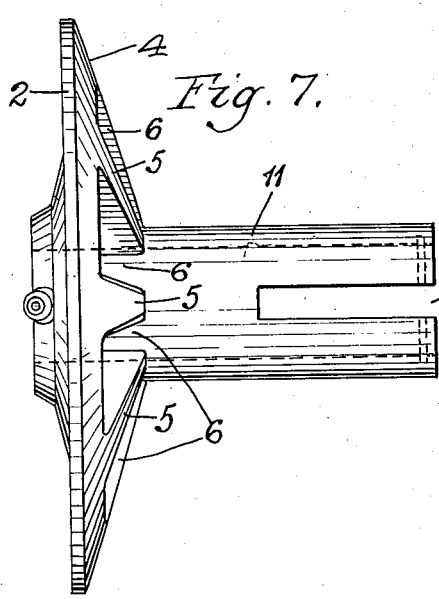
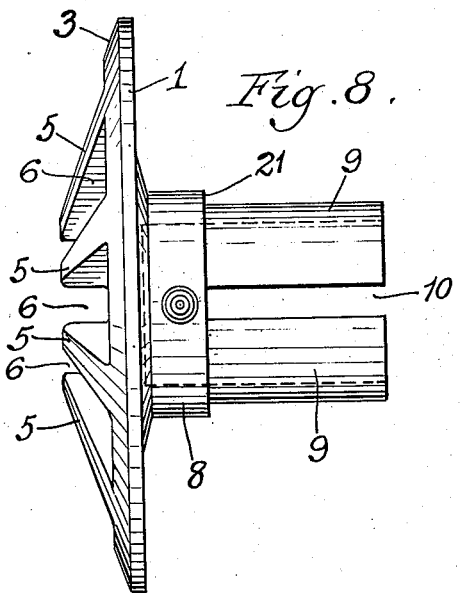
Inventor
John H. Hennessy
by Parker & Carter
Attorneys.

Patented Mar. 9, 1943

2,313,436

UNITED STATES PATENT OFFICE 2,313,436

VARIABLE SPEED DEVICE

John A. Hennessy, Sycamore, Ill., assignor to Ideal Commutator Dresser Company, Sycamore, Ill., a copartnership composed of John Walter Becker and Louis C. Becker Application October 31, 1941, Serial No. 417,299

4 Claims. (Cl. 74—230.17)

This invention relates to variable speed devices and has for its object to provide a new and improved device of this description.

The invention has a further object to provide a variable speed device having a pulley with two separate relatively moveable spring pressed members provided with separate springs.

Invention has as a further object to provide a variable speed device having a pulley arranged so that the center line of the belt is maintained in the same position regardless of the various positions of the pulley members.

Invention has its object further to provide a variable speed device which may be placed with its axis in a vertical direction and will still operate properly.

Invention has further objects which are more particularly set out in the accompanying description.

Referring now to the drawings:

Fig. 3 is a sectional view taken on line 3—3 of Fig. 1.

Fig. 4 is a sectional view taken on line 4—4 of Fig. 1.

Fig. 5 is a sectional view taken on line 5—5 of Fig. 1.

Fig. 6 is a sectional view taken on line 6—6 of Fig. 1.

Fig. 7 is a view of the left pulley member of Fig. 1.

Fig. 8 is a view of the right pulley member of Fig. 1.

Like numbers refer to like parts throughout the several figures.

In the construction herein shown the pulley has two members, 1 and 2, having opposed inclined faces 3 and 4. Instead of being plain faces, these faces are curved.

Figure 2:
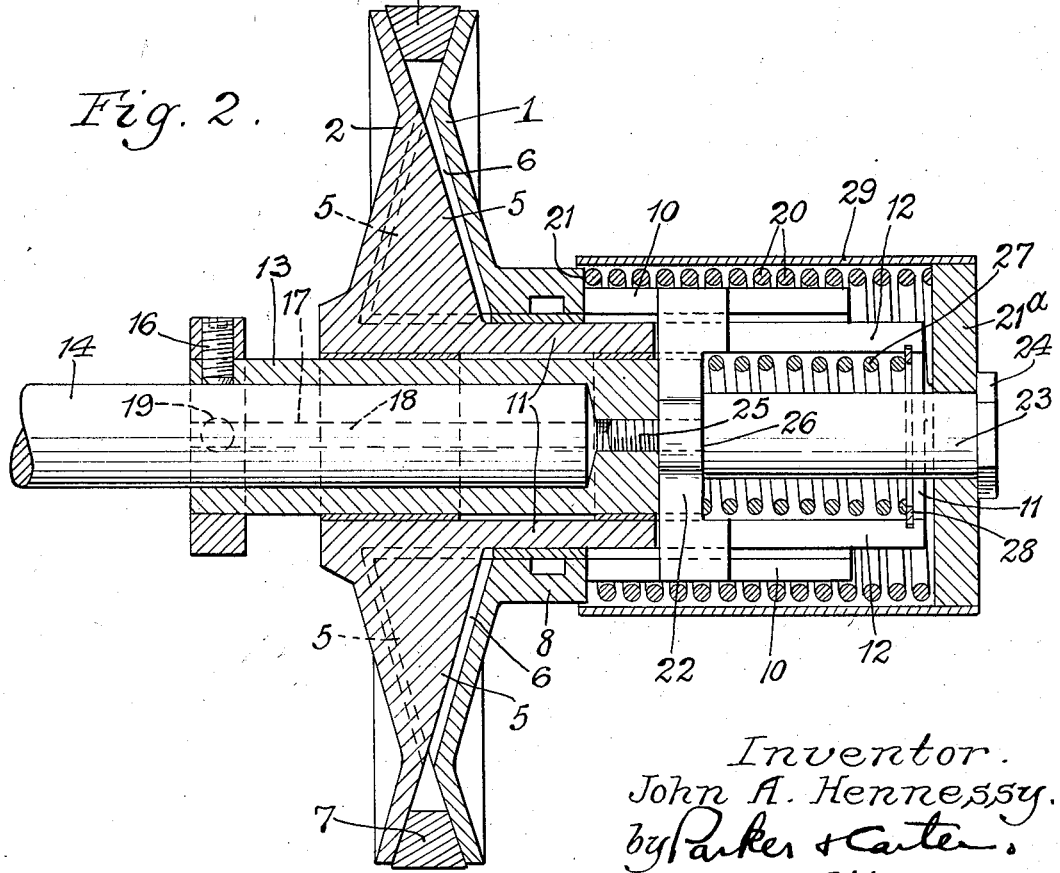
Fig. 2 is a view similar to Fig. 1 showing the belt at the top of the space between the pulley members.

Each of the pulley members is provided with a series of inwardly projecting parts 5 and recesses 6. The recesses of one member are opposite the projections of the other member so that as the pulleys are brought together the projections enter the recesses, as shown in Fig. 2.

The pulley is shown as one to be used in connection with the belt 7 of the form illustrated.

The pulley member 1 is provided with a hub having an enlarged portion 8 and a portion of smaller diameter 9. The portion 9 is provided with slots 10 on opposite sides thereof.

The pulley member 2 is provided with a hub 11 having the opposed slots 12. The hub 11 of the pulley member 2 projects into the central portion of the pulley section 1 and its hub, as clearly shown in Figs. 1 and 2.

The pulley member 2 is mounted on a sleeve 13 which in turn is mounted upon a shaft 14. A stop member 15 surrounds the sleeve 13 and is connected thereto in any desired manner, as by means of a fastening device 16 which is here shown as a screw passing through the stop device and the sleeve 13 and abutted against the shaft 14.

The shaft 14 is provided with a keyway 17 and a key 18. A fastening device 19 passes through the stop device 15 and the sleeve 13 and engages the key 18, see Fig. 6.

The portion 9 of the pulley member 1 has on the exterior thereof a spring 20, one end of which bears against the shoulder 21 of the part 8 of the hub. The other end of this spring bears against a member 21a. This spring applies pressure to the pulley member 1 so as to move it toward the pulley member 2 when it is free to move.

The pulley members and associated parts are arranged to rotate together. As herein shown, there is a connecting member 22, the ends of which enter the slots 10 on the hub of pulley member 1 and the slots 12 on the hub of pulley member 2, the hubs being moveable with relation to this connecting member.

The member 21a is held in position in any suitable manner, as for example by means of a holding device having the enlarged portion 23 with a non-circular end 24 to which a tool can be applied to rotate it. The holding device is provided with a threaded reduced end 25 which passes through a hole in the connecting member 22 and into a threaded hole in the end of the sleeve 13, see Figs. 1 and 2. The holding device is provided with a shoulder 26 which engages the face of the connecting member 22.

Figure 1:
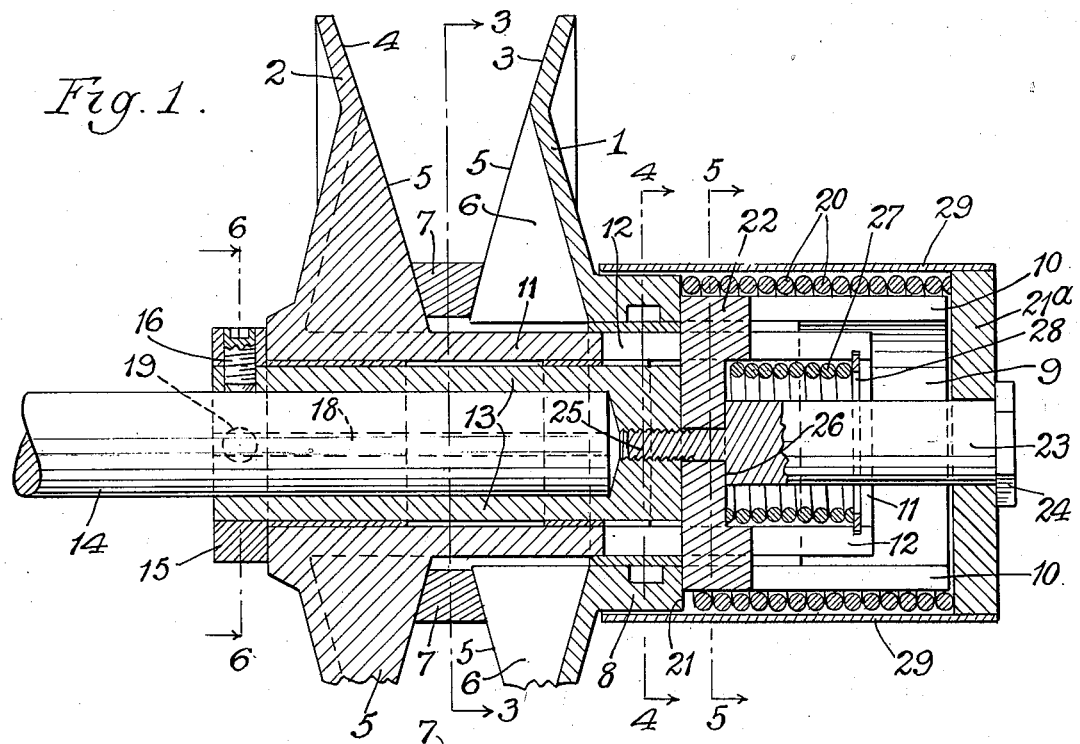
Fig. 1 is a sectional view through one form of a variable speed device embodying the invention showing the pulley members with the belt at the bottom of the space between them.

A spring 27 surrounds the enlarged portion 23 of the holding device and has one end engaging the connecting member 22, the other end engaging a holding piece 28 which is connected with the hub portion 11 of the pulley member 2, see Figs. 1 and 2. This spring exerts a pressure on the hub of the pulley member 2 so as to move it toward the pulley member 1 when it is free to move. An outer casing 29 surrounds the spring 20.

The use and operation of my invention are as follows:

When in use the belt 7 passes around the pulley between the pulley members 1 and 2, and passes to another pulley mounted on another shaft. The speed of the belt 7 is varied by having it nearer or farther away from the hubs of the pulley members. The farther the belt is from the hubs of the pulley members the greater the speed thereof. When the belt is in between the pulley members 1 and 2, the springs 20 and 21 exert pressure on the hubs of the pulley members so as to move them towards each other and towards the belt to clamp the belt with sufficient friction.

When the belt is nearest the hubs of the pulley members, as shown in Fig. 1, these members are spread apart their greatest distance. This position of the parts is shown in Fig. 1. As the belt is moved outwardly away from the hub, the pulley members 1 and 2 are moved towards each other by the springs 20 and 27, the hub of the pulley member 1 sliding on the hub of the pulley member 2 and the hub of the pulley member 2 sliding upon the sleeve 13. The slots in the hubs of the pulley members permit this movement as they permit the hub to slide along the connecting member. This position of the parts is illustrated in Fig. 2.

I claim:

1. A variable speed device comprising two separate pulley members adapted to receive a belt between them, a shaft upon which the pulley members are slideably mounted, a connecting device for connecting the pulley members with the shaft so that they will rotate therewith, and two separate springs for applying pressure in opposite directions to the pulley members to move them towards and away from each other, one of said springs being located within and surrounded by the other.

2. A variable speed device comprising two separate pulley members adapted to receive a belt between them, each of said pulley members being provided with hollow elongated hub members, the hub members of the pulley members overlapping so as to provide an outer hub member and inner hub member, a spring surrounding the outer hub member and having one end engaging the hub member and the other end engaging a stationary part, a second spring on the interior of the inner hub member having one end engaging a fixed part and the other end connected with said inner hub member.

3. A variable speed device comprising two separate pulley members adapted to receive a belt between them, each of said pulley members being provided with hollow elongated hub members, the hub members of the pulley members overlapping so as to provide an outer hub member and inner hub member, a spring surrounding the outer hub member and having one end engaging the hub member and the other end engaging a stationary part, a second spring on the interior of the inner hub member having one end engaging a fixed part and the other end connected with said inner hub member, a connecting member connecting the two hubs together, said hubs slideably connected with said connecting member.

4. A variable speed device comprising a shaft, a sleeve mounted upon said shaft two pulley members slideably mounted on said sleeve, a connecting member which connects the two pulley members so that they will rotate together, said pulley members slideably connected with said connecting member, two springs, one connected with each pulley for applying pressure thereto, both of said springs being on one side of said pulleys.

JOHN A. HENNESSY.